Patented Nov. 28, 1922.

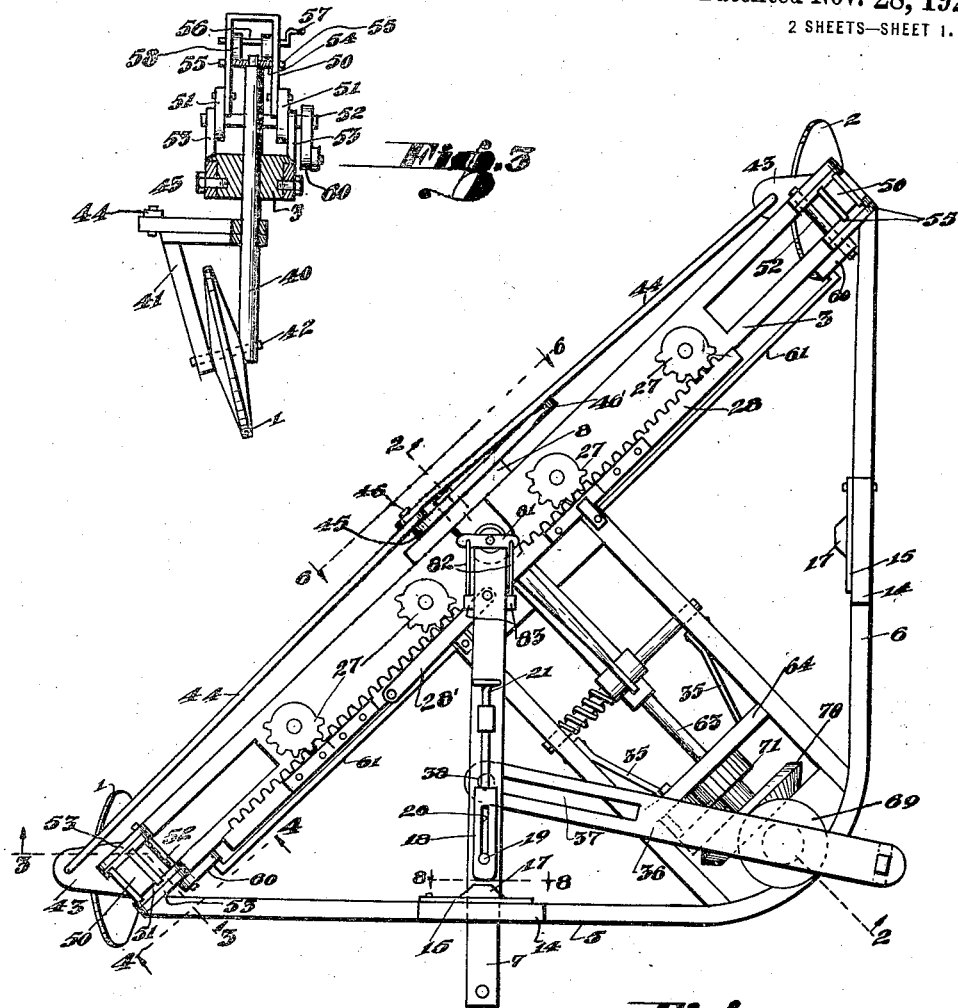

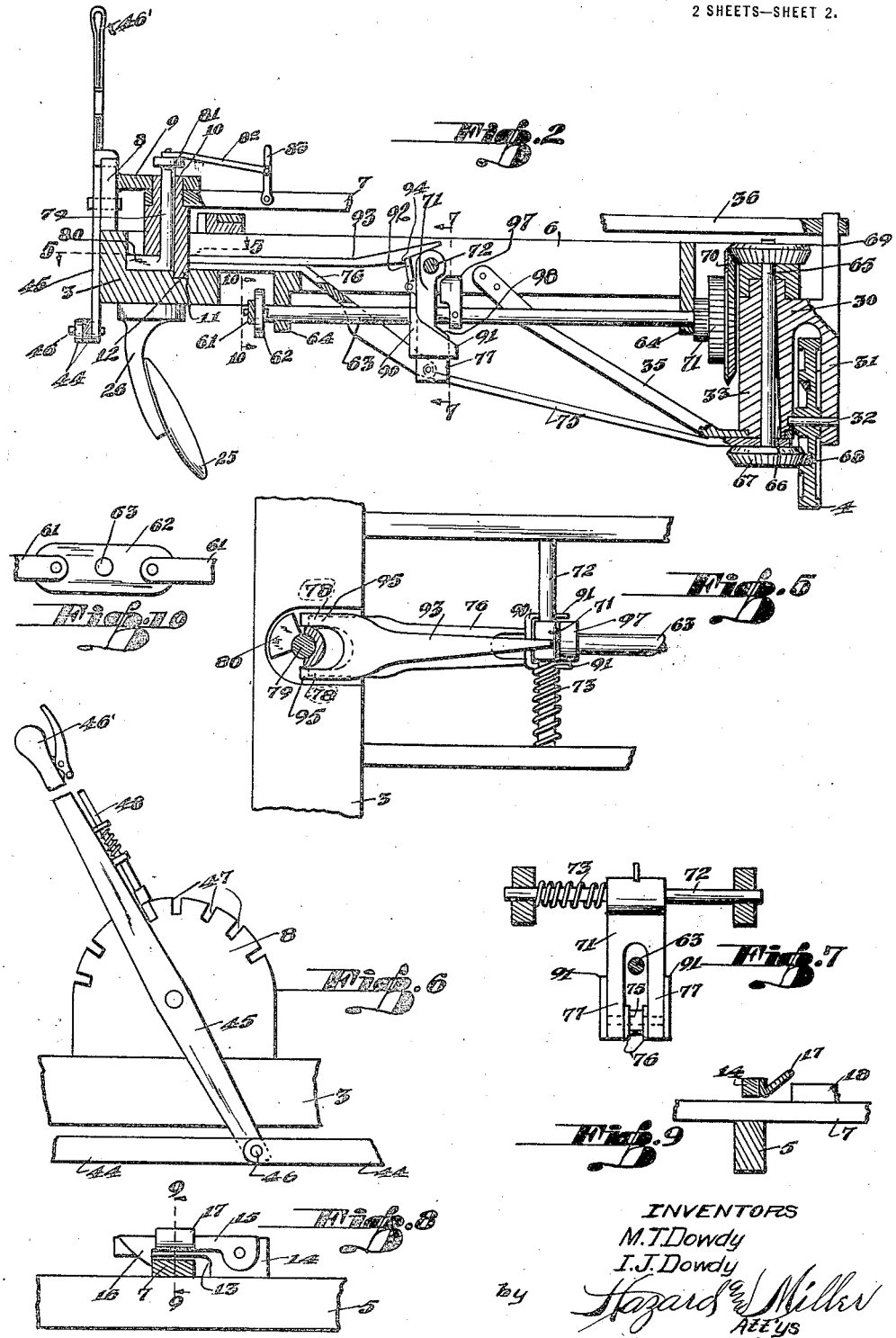

1,437,294

UNITED STATES PATENT OFFICE.

MORTON T. DOWDY AND IRVIN J. DOWDY, OF EAST BAKERSFIELD, CALIFORNIA.

PLOW.

Application filed October 11, 1920. Serial No. 416,121.

*To all whom it may concern:*

Be it known that we, MORTON T. DOWDY and IRVIN J. DOWDY, citizens of the United States, residing at East Bakersfield, in the county of Kern and State of California, have invented new and useful Improvements in Plows, of which the following is a specification.

It is the object of this invention to provide a plow which may be constructed as a gang-plow, and which is particularly adapted for hillside plowing.

More specifically, it is the object of the invention to provide a plow of this character adapted to be moved in opposite directions so that the hillside wheel of the plow may extend from either side of the same. The reversing mechanism includes means for reversing the position of the draft arm of the plow and reversing the hillside wheel through the reversing movement of the draft arm. The invention also contemplates the provision of a manually operated adjustment whereby the downhill wheels of the plow may be accurately positioned when the plow is moving in either direction, in order to provide the proper relation between the wheels and the direction of draft.

It is a still further object of the invention to provide means whereby the downhill wheels of the plow may be independently raised and lowered with relation to the plow, in order to properly position the plow with relation to the ground when one or the other of the downhill wheels is running in a furrow.

It is a still further object of the invention to provide means whereby both of the downhill wheels of the plow may be raised and lowered with relation to the plow through power driven mechanism, in order to move the plow into either operative or inoperative position. The other objects of the invention will be readily understood from the following description of the accompanying drawings in which—

Figure 1 is a plan view of a plow constructed in accordance with the invention.

Figures 2, 3 and 4 are vertical sections on the lines 2—2, 3—3 and 4—4 of Figure 1.

Figure 5 is a horizontal section on the line 5—5 of Figure 2.

Figure 6 is a vertical section on the line 6—6 of Figure 1.

Figure 7 is a vertical section on the line 7—7 of Figure 2.

Figure 8 is a vertical section on the line 8—8 of Figure 1.

Figure 9 is a vertical section on the line 9—9 of Figure 8.

Figure 10 is a vertical section on the line 10—10 of Figure 2.

The plow comprises a substantially triangular frame carrying the downhill wheels 1 and 2 at the respective ends of the base 3 of the triangle forming the frame. The hillside wheel 4 is supported at the apex of the triangle formed by the arms 5 and 6 of the frame. The draft bar 7 is arranged to either project beyond arm 5 or arm 6 in order that the plow may be moved in opposite directions. By this arrangement it will be understood that when the draft arm is in the position shown in Figure 1, the hillside will extend upwardly from the left hand side of the plow in the direction of its movement, while the hillside will extend upwardly from the right hand side of the plow in the direction of the movement of the same, when the draft arm projects beyond the bar 6. When the plow is moving in either direction, the wheels 1 and 2 will straddle the furrows being plowed, and said furrows will be plowed by a gang of plow disks arranged along the base bar 3.

The invention contemplates the provision of means whereby the swinging of the draft arm from one to the other of its operative positions will turn the plow disks so as to operatively position the same when the plow is moving in either direction. This movement of the draft arm is also arranged to turn the hillside wheel 4 into proper position. Manually controlled means are also provided for adjustably turning the downhill wheels 1 and 2 so that they will be in proper position relative to the draft when the plow is moving in either direction.

As an instance of this arrangement, an arcuate plate 8 projects upwardly midway of the length of bar 3, and the bearing bracket 9 projects from said plate in spaced relation above bar 3. A sleeve 10 is journaled in this bearing bracket, and the lower end of the same is provided with an annular lip 11 received in an annular bearing 12 provided in bar 3. A draft arm 7 is fixed to sleeve 10 and projects therefrom beneath the bearing bracket 9. The draft arm rests upon the upper side of arms 5 and 6, and at its draft position upon the respective arms the draft arm is arranged to be received in recesses 13 provided by lugs 14 extending upwardly through the bars 5 and 6. A catch 15 is pivoted to each of the lugs 14, and is provided with a head 16 adapted to drop down over recess 13 after the draft arm is in position within the same. The head 16 is provided with a usual tapered end adapted to lift the catch as the draft arms move into the recess. The catch is provided with an inclined abutment 17 adapted to be engaged by a bolt 18 carried by the draft arm. This bolt is guided longitudinally along the draft arm by means of a pin 19 extending through slot 20 in the bolt, and said bolt may be projected and retracted by means of an actuating rod 21. As the draft arm is being moved into one or the other of its operative positions, bolt 18 is retracted and when the draft arm has been locked in position within one of the recesses 13 by means of the catch 16 and it is desired to release said catch in order to permit the moving of the draft arm to its other position, the bolt is projected forwardly so as to engage the inclined abutment and thereby swing the catch upwardly upon its pivot for releasing the draft arm.

The movement of the draft arm from one operative position to the other is arranged to swing the gang of plows carried by the implement into alinement with the draft of the machine. For this purpose the plows are shown as disk plows 25 which are each journaled upon a supporting standard 26 which extends through the bar 3 of the implement and is journaled in the same. The respective plow disks of the gang are arranged in spaced relation along the bar 3. Supporting standards 26 journaled in the bar 3 have pinions 27 fixed upon their upper ends above the bar of the frame. These pinions all mesh with a rack bar 28 extending along bar 3 and provided with suitable means for guiding the rack bar during its reciprocating movement while in mesh with the pinions 27. A link 28' is pivoted at its respective ends to the rack bar and to the draft arm, said link being so arranged that when the draft arm is in one operative position, the rack bar will have been moved so as to turn pinions 27 to bring the gang of plows into alinement with the draft of the implement. When the draft arm is swung to its other operative position the link is arranged to move the rack bar so as to partially rotate pinions 27 a sufficient distance to swing the gang of plows into alinement with the new direction of draft of the implement.

The movement of the draft arm is arranged to swing the hillside wheel 4 into alinement with the draft by the following described mechanism.

A supporting standard 30 depends from, and is journaled in the implement frame at the apex of the triangle formed by arms 5 and 6. This supporting standard is provided with a bracket arm 31 extending at its opposite ends above and below the frame of the implement. The wheel 4 is journaled upon a shaft 32 between the lower end of the bracket 31 and the main portion of the supporting standard which is formed as a sleeve 33. The supporting standard is carried by the frame of the implement by means of suitable brackets 35. The supporting standard is arranged for turning movement relative to the implement frame, and an operating arm 36 is fixed relative to the upper end of bracket 31, and is connected to the draft arm so as to cause said turning movement of the supporting standard when the draft arm is moved. As an instance of this arrangement the swinging end of operating arm 36 is provided with an elongated slot 37 through which projects a pin 38 carried by the draft arm, the parts being so arranged that when the draft arm is swung from one position to the other, the operating arm 36 will be turned a sufficient distance to bring wheel 4 into alinement with the draft of the machine.

The manually operated means for adjusting the position of wheels 1 and 2 relative to the draft of the machine may be constructed as follows:

The wheels 1 and 2 are each carried by a supporting rod 40 extending through the respective ends of bar 3 and axially slidable relative to the same. Upon the lower ends of rods 40 brackets 41 are provided, and the wheels 1 and 2 are journaled upon shafts 42 between the rods 40 and the brackets 41. The brackets 41 carry arms 43 projecting laterally from rods 40 and fixed thereto, and actuating rods 44 are each fixed at one of their ends to the respective arms 43. The opposite ends of rods 44 are pivoted to the end of a lever arm 45, as shown at 46. This lever arm is pivoted intermediate of its ends to the arcuate plate 8, and the free end of the lever forms a handle 46' by means of which the lever may be swung upon its pivot so as to actuate the rods 44. The parts are so arranged that the wheels 1 and 2 will be maintained in alinement during the adjustment of the same, and the rotary adjustment of these wheels may be accurately regulated by moving the lever 45 to any desired position relative to arcuate plate 8. The arcuate plate is preferably provided with a plurality of notches 47, and the handle end of the lever arm is provided with a usual retractible catch 48 adapted to be received in any one of the notches for maintaining the lever arm and wheels 1 and 2 in any desired adjusted position.

The mountings for wheels 1 and 2 whereby said wheels may be raised or lowered relative to the implement frame consists of a U-shaped bracket 50 received over the upper end of each of the rods 40. The ends of the arms extend downwardly along opposite sides of the rods 40, and are pivoted to cranks 51 fixed upon a shaft 52 extending transversely of rod 40 at one side thereof and journaled in suitable brackets 53 carried by the bar 3.

A plate 54 is received upon the upper end of rod 40 between the arms of the U-shaped bracket, said plate being provided with lugs projecting beyond the respective arms of the bracket at opposite sides of the same, as shown at 55, in order to guide the U-shaped bracket during reciprocating movement relative to the rod 40. The base of the U-shaped bracket is spaced from plate 54, and a shaft 56 is journaled in the bracket transversely of rod 40 in the space above plate 54. This shaft may be turned by means of a crank handle 57, and cams 58 are fixed upon said shaft. By turning shaft 56 the cams 58 may be either brought into engagement or moved into disengagement with plate 54 in order to adjust the position of bracket arm 50 in relation to rod 40. The shaft 52 being held against rotation and bracket arm 50 thus being fixed with relation to shaft 52 and the implement frame, when cams 58 are turned the rod 40 and plate 54 will be raised and lowered with relation to the implement frame. As a result, the wheels 1 and 2 carried by the rods 40 may be independently raised or lowered with relation to the implement frame through actuation of the respective shafts 56. These wheels may thus be adjusted so that the plows will properly engage the ground when the one or the other of the wheels is running in a furrow.

The wheels 1 and 2 having been thus independently adjusted, said wheels are arranged through power actuated mechanism to be simultaneously raised and lowered in order to position the plows in either operative or inoperative position. As an instance of this arrangement a crank 60 is fixed upon each of the shafts 52 and actuating rods 61 are each connected at one of their ends to said cranks. The opposite ends of these actuating rods are pivoted to the respective ends of a bar 62 which is fixed midway of its length to a shaft 63 journaled on the implement frame and extending from the bar 3 to the supporting standard for the hillside wheel 4. This shaft may be journaled in suitable brackets 64 depending from the implement frame. The parts are so arranged that when shaft 63 is rotated through a driving connection from wheel 4, the actuating rod 61 will be moved to turn shaft 52 through the cranks 60 in a direction to shift the brackets 50 downwardly with relation to the implement frame by means of the cranks 51. This downward movement of brackets 50 through plates 54 will shift rods 40 downwardly relative to the implement frame and thereby raise the implement frame relative to wheels 1 and 2 so as to withdraw the plow disks from operative engagement with the ground. When shaft 63 has been rotated a sufficient distance to thus cause elevation of the plow disks, the rotation of the same is automatically discontinued and the shaft fixed against reverse rotation in order to maintain the plow disks in their elevated position. When it is again desired to lower the plow disks to operative position, the shaft 63 is released and the weight of the implement will then cause a reverse rotation of the same in order to reverse actuating rods 61 and thereby lower the implement frame with relation to wheels 1 and 2.

The mechanism for thus actuating and controlling shaft 63 includes a shaft 65 journaled in the sleeve 33. The bore of this sleeve is enlarged transversely as shown at 66, in order that the shaft journaled in said bore may be laterally shifted with relation to the sleeve. The lower end of this shaft carries a bevel gear 67 adapted to be moved into or out of meshing engagement with a bevel gear 68 carried by wheel 4. Upon the upper end of shaft 65 a bevel gear 69 is fixed and this bevel gear meshes with the bevel gear 70 journaled upon shaft 63. A suitable reduction gearing 71 is provided between bevel gear 70 and the shaft 63.

The means employed for shifting shaft 65 in the bore 66 so as to engage or disengage gear 67 with gear 68 includes an oscillating arm 71 journaled upon a shaft 72 extending transversely of the implement frame above the shaft 63. The oscillating arm is arranged between the ends of shaft 63, and a spring 73 is fixed at its respective ends to the oscillating arm and to the shaft 72 for yieldably retaining the oscillating arm in substantially upright position. A connecting rod 75 is fixed to the swinging end of arm 71 and at its opposite end is received around the shaft 65 so that the oscillation of arm 71 will engage or disengage the driving connection between wheel 4 and shaft 63.

The means employed for thus oscillating arm 71 includes a yoke arm 76 having the arms of the yoke connected to the respective depending portions 77 of arm 71. The opposite end of arm 76 is received in a bearing recess 77 provided in bar 3 surrounding sleeve 10. This end of arm 76 is a yoke having the respective arms 78 of the same received at the respective sides of the axis of sleeve 10. A pivot rod 79 is journaled in sleeve 10, and is provided with an arcuate lateral projection 80 at its lower end in alinement with the yoke arms 78.

A cross arm 81 is fixed upon the upper end of rod 79 and links 82 connect the respective ends of this cross arm with foot pedals 83 arranged upon opposite sides of the draft arm 7. The parts are so arranged that with the draft arm in one or the other of its operative positions, depression of one or the other of pedals 83 will turn the arcuate projection 80 so as to impinge against one or the other of yoke arms 78 for shifting the arm 76 so as to swing oscillating arm 71 forwardly. This movement of the oscillating arm will cause gear 67 to mesh with gear 68 and thereby rotate shaft 63. It will be understood that with oscillating arm 71 in its normal position gears 67 and 68 are out of mesh.

The rotation of shaft 63 will elevate the plow frame, as previously described, and when the shaft has been turned a sufficient distance to cause said elevation, the oscillating arm 71 is automatically returned to normal position with gear 67 out of mesh with gear 68, and the shaft 63 is locked against reverse rotation. When it is desired to again lower the plow frame the locking means for shaft 63 is released and the weight of the plow frame will then cause the same to be lowered to again bring the plow into operative position. For this purpose, a latch arm 90 is pivoted to oscillating arm 71, and is provided with sides 91 extending on opposite sides of the oscillating arm. The latch arm 90 is also provided with an upwardly extending actuating finger 92 arranged to move the latch arm into operative or inoperative position when engaged by a connecting arm 93. This connecting arm is provided with a lug 94 arranged to engage the finger 92 as the connecting arm is moved forward in order to swing latch arm 90 into inoperative position. When the finger 92 is released the latch arm will swing by its own weight into operative position. At its rear end the connecting arm 93 is arranged as a yoke having its arms 95 received at opposite sides of sleeve 10 and adapted to be engaged by the arcuate projection 80 slightly in advance of the engagement between said arcuate projection and the yoke arms 78.

By this arrangement it will be seen that when one or the other of pedals 83 is depressed, the latch arm 90 will first be swung into inoperative position, and the oscillating arm 71 will then be actuated for causing rotation of shaft 63. A lug 97 is fixed upon shaft 63 for rotation with the same. A shoulder 98 is formed upon arm 71 and when shaft 63 has been rotated the desired distance, the lug 97 is arranged to impinge against said shoulder for swinging arm 71 back to normal position, thereby disengaging the driving connection for the shaft. The foot pedal 83 having been previously released, the latch arm 90 will then swing back to operative position with its sides 91 at opposite sides of the lug 97. The lug is thus held against movement, and, as a consequence, the shaft 63 is held against rotation. When it is desired to lower the plow frame the shaft 63 is released in order to permit reverse rotation of the same by depressing pedal 83 a sufficient distance to move latch arm 90 into inoperative position without swinging arm 71 so as to make engagement between wheel 4 and shaft 63. The lug 97 is now free for rotation, and the weight of the plow frame will cause said rotation of the lug and shaft 63 in the reverse direction in order to again lower the frame.

Various changes may be made in the construction as thus described, without departing from the spirit of the invention.

What is claimed is:

1. A reversible plow having a frame supporting separate earthworking appliances, toothed wheels fastened to the shafts of said appliances, a rack engaging said toothed wheels, a link connecting said rack and draft arm so as to reverse said appliances when the draft is reversed.

2. A plow comprising a supporting frame, separate earthworking appliances having vertical shafts rotatably mounted in the frame, a shiftable draft arm arranged for draft in opposite directions, toothed wheels upon the shafts of the earthworking appliances, a rack engaging the toothed wheels and connected to the draft arm so that when the draft arm is shifted the appliances are shifted, down hill wheels for supporting the frame at opposite sides of the earthworking appliances, a hill side wheel for supporting the other side of the frame and having a vertical shaft, and an arm connected to the vertical shaft of the hill side wheel and having slidable engagement with the draft arm so that shifting of the draft arm turns the hill side wheel.

3. A plow comprising a supporting frame, separate earthworking appliances having vertical shafts rotatably mounted in the frame, a shiftable draft arm arranged for draft in opposite directions, toothed wheels upon the shafts of the earthworking appliances, a rack engaging the toothed wheels and connected to the draft arm so that when the draft arm is shifted the appliances are shifted, down hill wheels for supporting the frame at opposite sides of the earthworking appliances, a hill side wheel for supporting the other side of the frame and having a vertical shaft, an arm connected to the vertical shaft of the hill side wheel and having slidable engagement with the draft arm so that shifting of the draft arm turns the hill side wheel, arms extending from the shafts of the down hill wheels, a hand lever, and connections between the hand lever and the arms for shifting the down hill wheels.

4. A plow comprising a triangular frame, disc plows having vertical shafts in one side of the frame, down hill wheels for supporting the ends of that side of the frame, a hill side wheel for supporting the other sides of the frame, a rack and gear connection between the vertical shafts, a shiftable draft arm arranged for draft in opposite directions and for operating the rack, an arm connected to the shaft of the hill side wheel and having a sliding connection with the draft arm so that shifting the draft arms shifts the disc plows and hill side wheel, and means for shifting the down hill wheels.

In testimony whereof we have signed our names to this specification.

M. T. DOWDY.
I. J. DOWDY.